(12) United States Patent
Coleman et al.

(10) Patent No.: US 11,240,207 B2
(45) Date of Patent: *Feb. 1, 2022

(54) NETWORK ISOLATION

(71) Applicant: L3 Technologies, Inc., New York, NY (US)

(72) Inventors: Glenn Coleman, Berwyn, PA (US); Peter Martz, Marlton, NJ (US); Kenneth Moritz, Lansdowne, PA (US)

(73) Assignee: L3 Technologies, Inc., New York, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/059,381

(22) Filed: Aug. 9, 2018

(65) Prior Publication Data
US 2019/0052604 A1 Feb. 14, 2019

Related U.S. Application Data

(60) Provisional application No. 62/544,024, filed on Aug. 11, 2017.

(51) Int. Cl.
*H04L 29/06* (2006.01)
*G06F 9/455* (2018.01)
(Continued)

(52) U.S. Cl.
CPC ...... *H04L 63/0281* (2013.01); *G06F 9/45558* (2013.01); *G06F 21/53* (2013.01);
(Continued)

(58) Field of Classification Search
CPC . H04L 63/0281; H04L 63/0218; H04L 63/08; H04L 63/1441; H04L 63/0227;
(Continued)

(56) References Cited

U.S. PATENT DOCUMENTS 7,150,040 B2 12/2006 Brownell
7,467,408 B1 12/2008 Otoole, Jr.
(Continued)

FOREIGN PATENT DOCUMENTS

RU 2406138 C1 12/2010

OTHER PUBLICATIONS

Barnet, Mark, "Praktikum Po Zaschite Seti Kompanii", Windows IT Pro/RE, Nov.-Dec. 2006, 4 pages.
(Continued)

*Primary Examiner* — Mohammed Waliullah
(74) *Attorney, Agent, or Firm* — Condo Roccia Koptiw LLP

(57) ABSTRACT

Methods and systems are disclosed for isolation of communications between a host computer system and one or more untrusted network destinations. An Internet isolation system may include a network, one or more host computer systems, a border firewall, an authorization device, and/or a proxy device. The Internet isolation system may be configured to implement network isolation between one or more untrusted network destinations, the one or more host computer systems, and/or the network. The network isolation may be implemented via one or more of a host-based firewall on each of the one or more host computer systems, the border firewall, the authorization device, the proxy device, an internal isolation firewall on each of the one or more host computer systems, and/or a segregation of a trusted memory space and an untrusted memory space on each of the one or more host computer systems.

19 Claims, 5 Drawing Sheets

(51) Int. Cl.
*G06F 21/57* (2013.01)
*G06F 21/53* (2013.01)

(52) U.S. Cl.
CPC .......... *G06F 21/57* (2013.01); *H04L 63/0218* (2013.01); *H04L 63/08* (2013.01); *H04L 63/1441* (2013.01); *G06F 2009/45583* (2013.01); *G06F 2009/45587* (2013.01); *G06F 2009/45595* (2013.01); *H04L 63/0227* (2013.01); *H04L 63/145* (2013.01)

(58) Field of Classification Search
CPC ... H04L 63/145; G06F 9/45558; G06F 21/53; G06F 21/57; G06F 2009/45583; G06F 2009/45587; G06F 2009/45595
See application file for complete search history.

(56) References Cited

U.S. PATENT DOCUMENTS

| | | | |
|---|---|---|---|
| 7,478,330 B1 | 1/2009 | Branson et al. | |
| 7,694,328 B2 | 4/2010 | Joshi et al. | |
| 7,698,442 B1 | 4/2010 | Krishnamurthy et al. | |
| 7,716,720 B1 | 5/2010 | Marek et al. | |
| 7,805,516 B2 | 9/2010 | Kettler et al. | |
| 7,870,153 B2 | 1/2011 | Croft et al. | |
| 7,926,086 B1 | 4/2011 | Violleau et al. | |
| 8,090,797 B2 | 1/2012 | Chinta et al. | |
| 8,539,561 B2 | 9/2013 | Pingali et al. | |
| 8,566,398 B2 | 10/2013 | Barnier et al. | |
| 8,613,070 B1 | 12/2013 | Borzycki et al. | |
| 8,769,268 B2 | 7/2014 | Morozov et al. | |
| 8,832,833 B2 | 9/2014 | Demopoulos et al. | |
| 8,931,054 B2 | 1/2015 | Huynh et al. | |
| 8,966,464 B1* | 2/2015 | Christopher | G06F 11/0712 717/166 |
| 9,294,492 B1 | 3/2016 | Martini et al. | |
| 9,386,021 B1* | 7/2016 | Pratt | H04L 63/10 |
| 9,438,634 B1 | 9/2016 | Ross et al. | |
| 9,465,734 B1 | 10/2016 | Myrick et al. | |
| 9,531,715 B1* | 12/2016 | Rodgers | H04L 63/0281 |
| 9,560,081 B1 | 1/2017 | Woolward | |
| 9,602,524 B2 | 3/2017 | Ghosh et al. | |
| 9,609,026 B2 | 3/2017 | Ross et al. | |
| 9,680,873 B1 | 6/2017 | Halls et al. | |
| 9,729,579 B1 | 8/2017 | Marino et al. | |
| 9,787,639 B1 | 10/2017 | Sun et al. | |
| 9,864,600 B2 | 1/2018 | Larimore et al. | |
| 9,921,860 B1 | 3/2018 | Banga et al. | |
| 9,942,198 B2 | 4/2018 | Hoy et al. | |
| 10,037,199 B2 | 7/2018 | Hung et al. | |
| 10,055,231 B1 | 8/2018 | Li et al. | |
| 10,122,703 B2 | 11/2018 | Innes et al. | |
| 10,375,111 B2 | 8/2019 | Schultz et al. | |
| 10,397,273 B1 | 8/2019 | Stickle et al. | |
| 10,521,612 B2 | 12/2019 | Arad et al. | |
| 10,554,475 B2 | 2/2020 | Weinstein et al. | |
| 10,558,798 B2 | 2/2020 | Weinstein et al. | |
| 10,873,589 B2 | 12/2020 | Cheetancheri et al. | |
| 10,931,669 B2 | 2/2021 | Coleman et al. | |
| 2002/0023212 A1 | 2/2002 | Proudler | |
| 2002/0040439 A1 | 4/2002 | Kellum | |
| 2002/0069366 A1 | 6/2002 | Schoettger | |
| 2002/0069369 A1 | 6/2002 | Tremain et al. | |
| 2005/0144467 A1 | 6/2005 | Yamazaki | |
| 2006/0070066 A1 | 3/2006 | Grobman | |
| 2006/0282795 A1 | 12/2006 | Clark et al. | |
| 2007/0136579 A1 | 6/2007 | Levy et al. | |
| 2007/0220187 A1 | 9/2007 | Kates | |
| 2007/0260873 A1 | 11/2007 | Hatfalvi et al. | |
| 2008/0016313 A1 | 1/2008 | Murotake et al. | |
| 2008/0028401 A1 | 1/2008 | Geisinger | |
| 2008/0201711 A1 | 8/2008 | Amir Husain | |
| 2008/0256536 A1 | 10/2008 | Zhao et al. | |
| 2009/0055924 A1 | 2/2009 | Trotter | |
| 2009/0164994 A1 | 6/2009 | Vasilevsky et al. | |
| 2009/0172781 A1 | 7/2009 | Masuoka et al. | |
| 2009/0249472 A1 | 10/2009 | Benjamini et al. | |
| 2009/0265760 A1 | 10/2009 | Zhu et al. | |
| 2009/0328038 A1 | 12/2009 | Yamada et al. | |
| 2010/0138829 A1 | 6/2010 | Hanquez et al. | |
| 2010/0138830 A1 | 6/2010 | Astete et al. | |
| 2010/0217916 A1 | 8/2010 | Gao et al. | |
| 2010/0223613 A1 | 9/2010 | Schneider | |
| 2010/0251329 A1 | 9/2010 | Wei | |
| 2011/0154431 A1 | 6/2011 | Walsh | |
| 2011/0299515 A1 | 12/2011 | Robertson et al. | |
| 2012/0017213 A1 | 1/2012 | Hunt et al. | |
| 2012/0023593 A1 | 1/2012 | Puder et al. | |
| 2012/0054744 A1 | 3/2012 | Singh et al. | |
| 2012/0265976 A1 | 10/2012 | Spiers et al. | |
| 2012/0266149 A1 | 10/2012 | Lebert | |
| 2013/0132948 A1 | 5/2013 | Hari et al. | |
| 2013/0145463 A1* | 6/2013 | Ghosh | G06F 21/53 726/22 |
| 2013/0318594 A1* | 11/2013 | Hoy | G06F 21/53 726/15 |
| 2014/0040979 A1 | 2/2014 | Barton et al. | |
| 2014/0059642 A1 | 2/2014 | Deasy et al. | |
| 2014/0075535 A1 | 3/2014 | Softer et al. | |
| 2014/0108558 A1 | 4/2014 | Borzycki et al. | |
| 2014/0115646 A1* | 4/2014 | Rajgopal | H04N 21/4622 725/110 |
| 2014/0282890 A1 | 9/2014 | Li et al. | |
| 2014/0344912 A1 | 11/2014 | Chapman et al. | |
| 2014/0351516 A1 | 11/2014 | Larimore et al. | |
| 2014/0380403 A1 | 12/2014 | Pearson et al. | |
| 2015/0106822 A1 | 4/2015 | Lei | |
| 2015/0156203 A1* | 6/2015 | Giura | H04L 67/02 726/4 |
| 2015/0248554 A1 | 9/2015 | Dumitru et al. | |
| 2015/0281176 A1 | 10/2015 | Banfield | |
| 2016/0057167 A1 | 2/2016 | Bach | |
| 2016/0134549 A1 | 5/2016 | Abel et al. | |
| 2016/0226834 A1* | 8/2016 | Dawson | H04L 63/0428 |
| 2016/0246974 A1 | 8/2016 | Broz et al. | |
| 2016/0248754 A1 | 8/2016 | Jahr | |
| 2016/0292694 A1 | 10/2016 | Goldschlag et al. | |
| 2017/0034174 A1 | 2/2017 | Jägers | |
| 2017/0076092 A1* | 3/2017 | Kashyap | G06F 21/554 |
| 2017/0142144 A1* | 5/2017 | Weinberger | H04L 63/0236 |
| 2017/0180413 A1 | 6/2017 | Petry et al. | |
| 2017/0206351 A1 | 7/2017 | Jay et al. | |
| 2017/0208067 A1* | 7/2017 | Sriramakrishnan | H04L 67/28 |
| 2017/0250997 A1 | 8/2017 | Rostamabadi et al. | |
| 2017/0293432 A1 | 10/2017 | Oldcorn et al. | |
| 2017/0317978 A1 | 11/2017 | Diaz-cuellar et al. | |
| 2017/0353496 A1* | 12/2017 | Pai | H04L 12/4641 |
| 2017/0359309 A1 | 12/2017 | Bolte et al. | |
| 2018/0027006 A1 | 1/2018 | Zimmermann et al. | |
| 2018/0115519 A1 | 4/2018 | Bonomi et al. | |
| 2018/0139178 A1* | 5/2018 | Gan | H04L 63/145 |
| 2018/0196945 A1 | 7/2018 | Kornegay et al. | |
| 2018/0198824 A1* | 7/2018 | Pulapaka | G06F 9/455 |
| 2018/0203995 A1 | 7/2018 | Yuen et al. | |
| 2018/0234422 A1 | 8/2018 | Odom et al. | |
| 2018/0276396 A1* | 9/2018 | Yablokov | G06F 21/53 |
| 2018/0330257 A1 | 11/2018 | Dodson et al. | |
| 2018/0367528 A1 | 12/2018 | Schwarz et al. | |
| 2019/0097972 A1 | 3/2019 | Coleman et al. | |
| 2019/0098007 A1 | 3/2019 | Coleman et al. | |
| 2019/0121961 A1 | 4/2019 | Coleman et al. | |
| 2019/0213325 A1 | 7/2019 | Mckerchar et al. | |

OTHER PUBLICATIONS

Burnett, Mark, "How I Secured One Company's Network", Using Log Parser, Virtualization, and A Little Psychology, Sep. 17, 2006, 4 pages.

Laverick, Mike, "Hypervisor Management and Optimization for Advanced Virtualization", Advanced Virtualization E-Book, 2010, 13 pages.

(56) References Cited

OTHER PUBLICATIONS

Li et al., "VSITE: A Scalable and Secure Architecture for Seamless L2 Enterprise Extension in the Cloud", 6th IEEE Workshop on Secure Network Protocols, Kyoto, Oct. 2010, pp. 31-36.
Reuben, Jenni Susan, "A Survey on Virtual Machine Security", TKK T-110.5290 Seminar on Network Security, Oct. 11-12, 2007, 5 pages.
Villeneuve, Nart, "Command and Control in the Cloud", Malware Explorer, Oct. 22, 2010, 3 pages.
Wikipedia, "Computer Networking", Available at https://en.wikipedia.org/wiki/Computer_network, Dec. 2010, 19 pages.
Wikipedia, "Computer Security", Available at https://en.wikipedia.org/wiki/Computer_security, retrieved on Dec. 2010, 27 pages.
Wikipedia, "Cyber Security Standards", Available at https://en.wikipedia.org/wiki/Cyber_security_standards, retrieved on Dec. 2010, 9 pages.
Wikipedia, "Http Secure", Available at https://en.wikipedia.org/wiki/HTTPS, retrieved on Dec. 2010, 9 pages.
Wikipedia, "Hypervisor", Available at https://en.wikipedia.org/wiki/Hypervisor , retrieved on Dec. 2010, 6 pages.
Wikipedia, "Internet Protocol", Available at https://en.wikipedia.org/wiki/Internet_Protocol, retrieved on Dec. 2010, 5 pages.
Wikipedia, "Multiprotocol Label Switching", Available at https://en.wikipedia.org/wiki/Multiprotocol_Label_Switching , retrieved on Dec. 2010, 8 pages.
Wikipedia, "Network Address Translation", Available at https://en.wikipedia.org/wiki/Network_address_translation, Dec. 2010, 12 pages.
Wikipedia, "Security-Focused Operating System", Available at https://en.wikipedia.org/wiki/Security-focused_operating_system, retrieved on Dec. 2010, 9 pages.
Wikipedia, "Virtual Desktop", Available at https://en.wikipedia.org/wiki/Virtual_desktop, retrieved on Dec. 2010, 5 pages.
Wikipedia, "Virtual Private Network", Available at https://en.wikipedia.org/wiki/Virtual_private_network, retrieved on Dec. 2010, 9 pages.
Chen, Yaohui et al., "Shreds: Fine-Grained Execution Units", 2016 IEEE Symposium on Security and Privacy, 2016, pp. 1-16.
Evtyushkin, Dmitry et al., "ISO-X: A Flexible Architecture for Hardware-Managed Isolated Execution", 2014 47th Annual IEEE/ACM International Symposium on Microarchitecture, 2014, pp. 1-13.
Mambretti, Andrea et al., "Trellis: Privilege Separation for Multi-User Applications Made Easy", 2016, pp. 1-20.
"NPL Search Term", Web Search History, 1 page, dated: Aug. 13, 2020.
Azab, et al., "SICE: A Hardware-Level Strongly Isolated Computing Environment for x86 Multi-Core Platforms", Proceedings of the 18th ACM Conference on Computer and Communications Security, Oct. 2011, pp. 375-388.
Bruckman, et al., ""Georgia Computes!": Improving the Computing Education Pipeline", Proceeding of the 40th ACM Technical Symposium on Computer Science Education, 2009, pp. 86-90.
Comodo, "Comodo Internet Security", Software Version 7.0, User Guide Version 7.0.111114, 2014, pp. 1-579.
Gupta, et al., "A Secure Architecture Design Based on Application Isolation, Code Minimization and Randomization", IEEE 6th Symposium on Security Analytics and Automation 2013, 2013, pp. 423-429.
Haq, et al., "Design and Implementation of Sandbox Technique for Isolated Applications", IEEE School of Computer Science and Technology, Beijing Institute of Technology, Beijing, China, 2016, pp. 557-561.
Hsu, et al., "Enforcing Least Privilege Memory Views for Multithreaded Applications", Proceedings of the 2016 ACM SIGSAC Conference on Computer and Communications Security, Oct. 2016, pp. 393-405.
Jauernig, et al., "Trusted Execution Environments: Properties, Applications, and Challenges", IEEE Computer and Reliability Societies, Resilient Security, Mar.-Apr. 2020, pp. 56-60.
Jung, et al., "An Architecture for Virtualization-Based Trusted Execution Environment on Mobile Devices", 2014 IEEE 11th International Conference on Ubiquitous Intelligence and Computing and 2014 IEEE 11th International Conference on Autonomic and Trusted Computing and 2014 IEEE 14th International Conference on Scalable Computing and Communications and, Associated Symposia/Workshops, 2014, pp. 540-547.
Kostiainen, et al., "Dedicated Security Chips in the Age of Secure Enclaves", IEEE Computerand Reliability Societies; Hardware-Assisted Security, Sep.-Oct. 2020, pp. 38-46.
Le, et al., "Computing the Real Isolated Points of an Algebraic Hypersurface", International Symposium on Symbolic and Algebraic Computation, Aug. 24, 2020, 12 pages.
Liu, et al., "Thwarting Memory Disclosure with Efficient Hypervisor-Enforced Intra-Domain Isolation", Proceedings of the 22nd ACM SIGSAC Conference on Computer and Communications Security, Oct. 2015, pp. 1607-1619.
Srivastava, et al., "Tamper-Resistant, Application-Aware Blocking of Malicious Network Connections", School of Computer Science, Georgia Institute of Technology, 2008, pp. 39-58.
Yadav, et al., "Impact & Analysis of Virtual Workspace on Grid Computing", International Journal of Science & Technology (IJST), vol. 2, Issue 2, Apr. 2012, pp. 24-32.
Yee, et al., "Native Client: A Sandbox for Portable, Untrusted x86 Native Code", 2009 30th IEEE Symposium on Security and Privacy, 2009, pp. 79-93.

\* cited by examiner

NETWORK ISOLATION

CROSS-REFERENCE TO RELATED APPLICATIONS

This application claims the benefit of U.S. Provisional Patent Application No. 62/544,024, filed Aug. 11, 2017, the contents of which is hereby incorporated by reference in its entirety.

BACKGROUND

The Internet provides access to a large number of systems from which beneficial and/or harmful data may be retrieved by a host computer system attached to and communicating over the Internet. Harmful data that can be accessed through the Internet includes a variety of viral software constructs, generally referred to as malicious software or malware. Malware may be downloaded to a host computer system unintentionally, for example, by and/or without the knowledge of the user of the host computer system.

A host computer system that has downloaded malware may be referred to as an infected host computer system. An infected host computer system may result in possible security losses, reduction of efficiency, and/or malfunctions. Security losses may include, but are not limited to, the loss of some or all data that is accessible by the infected host computer system, the installation of additional malware onto the infected host computer system, and/or the loss of command and control of the infected host computer system. Reduction of efficiency may be incurred from, but not limited to, additional processor demand, additional memory usage, and/or additional network access by the executing malware The security and privacy of the user of the infected host computer system may be compromised by malware. Both information located on the infected host computer system and/or information stored on or communicated via a local area network may be susceptible to attack by the malware. In many instances, an infected host computer may be used by the malware as a vehicle to stage an attack on other network resources that are accessible from the infected host computer system. Such an attack method is often undetected by the user of the host computer system and/or network administrators.

An infected host computer system may lose command and control. The loss of command and control of the infected host computer system may include performing one or more actions the author of the downloaded malware may desire. For example, the malware may perform a reconnaissance of the infected host computer system, determine system privileges, access (e.g., communicate with) local files, access security tokens, and/or attempt infection or access of other network resources accessible from the infected computer system

SUMMARY OF THE INVENTION

Methods and systems are disclosed for isolation of communications between a host computer system and one or more untrusted network devices or destinations. An Internet isolation system may include a network, a host computer system, a border firewall, an authorization device, and/or proxy device (e.g., such as a web proxy). The host computer system may include a processor and memory. The network may include one or more of a local area network (LAN), a wide area network (WAN), a cellular network, a Wi-Fi network, a digital subscribers line (DSL) network, a cloud computing network, a data center, an ad-hoc network, a satellite network, a cable modem network, and/or the like. The cloud computing network may include one or more of an Infrastructure as a Service (IaaS) or a Platform as a Service (PaaS) applications. The networked computer system may be configured to implement network isolation between one or more untrusted network destinations and various untrusted network(s). The network isolation may be implemented via one or more of a host-based firewall on a host computer system, a border firewall around a portion of a network that includes the host computing system, an authorization device, a proxy device, an internal isolation firewall on the host computer system, and/or a segregation of a trusted memory space and an untrusted memory space.

The host computer system may be configured to communicate with (e.g., access) one or more untrusted network destinations via a first communication channel. The host computer system may be configured to communicate with one or more trusted network destinations via a second communication channel. The host computer system may be configured to enforce separation of the first communication channel and the second communication channel. Even if malware may be introduced to the host computer system, the host computer system and/or network nodes may be configured to implement network isolation techniques that prevent the malware from moving to other devices on the networked computer system.

For example, a host-based firewall may be configured to prevent lateral communication and/or movement of malware between the host computer system and other devices on the networked computer system. A proxy device/server may be configured to prevent unauthorized communication between the host computer system and the one or more untrusted network destinations (e.g., Internet destinations). The segregation of the trusted memory space and the untrusted memory space may be enforced by the internal isolation firewall. The host based computer system may be configured to run one or more applications and/or processes in the untrusted memory space that are configured to communicate with the one or more untrusted network destinations. The host computer system may be configured to run one or more applications and/or processes in the trusted memory space that are configured to communicate with one or more devices on the network (e.g., trusted devices on the network). Applications running in the untrusted memory space may be blocked from communicating with trusted destinations and applications running in the trusted memory space may be blocked from communicating with untrusted destinations.

An internet isolation system may include a network having one or more host computer systems, an authorization device, a proxy device, and/or a border firewall. A host computer system may be configured to connect to a network. The host computer system may be configured to implement an operating system. The operating system may enable operation of a workspace. The workspace may be configured to enable operation of a first set of one or more applications and/or processes. The workspace may be enabled by and/or executed using a first memory space. The host computer system may be configured to implement a sandboxed computing environment. The sandboxed computing environment may be configured to enable operation of a second set of one or more applications and/or processes. The sandboxed computing environment may be considered an untrusted memory space. The sandboxed computing environment may be configured to authenticate with the authorization device. The sandboxed computing environment may be configured to classify a network destination as trusted or untrusted based on a whitelist including a list of trusted network destinations and/or a blacklist including a list of untrusted network destinations. The trusted network destinations may be communicated with via one or more of the first set of one or more applications and/or processes associated with the workspace. The sandboxed computing environment may be enforced by a sandbox container process. The sandboxed computing environment may be enabled by and/or executed using a second memory space. The first memory space and the second memory space may be isolated, for example, by the sandbox container process.

The host computer system may be configured to isolate, using an internal isolation firewall, the sandboxed computing environment from the workspace. For example, the internal isolation firewall may enforce a separation of the sandboxed computing environment and the workspace. The internal isolation firewall may segregate storage memory associated with the workspace from storage memory associated with the sandboxed computing environment. The internal isolation firewall may allow a predefined set of processes to be executed within the sandboxed computing environment. The sandbox container process may prevent execution in the sandboxed computing environment of any processes outside of the predefined set of processes. The internal isolation firewall may be configured to prevent data from being communicated between the sandboxed computing environment and the workspace, for example, without an explicit user input. The sandbox container process may enable the internal isolation firewall.

The host computer system may prevent, using a host-based firewall, communication between the host computer system and one or more other devices on the network. The host-based firewall may be configured to block incoming traffic from one or more devices on the network and/or one or more devices on the Internet. The host computer system may communicate, using the second set of one or more applications and/or process operating on the sandboxed computing environment, with untrusted network destinations via the proxy device. The authorizing device and the proxy device may be the same device (e.g., a single device). At least one of the untrusted network destinations is located on the Internet and may be communicated with, using the proxy device, via a browser process operating within the sandboxed computing environment upon authentication via the authorization device. The border firewall may be configured to block unauthorized communications between the network and the untrusted network destinations.

DETAILED DESCRIPTION

Figure 1:
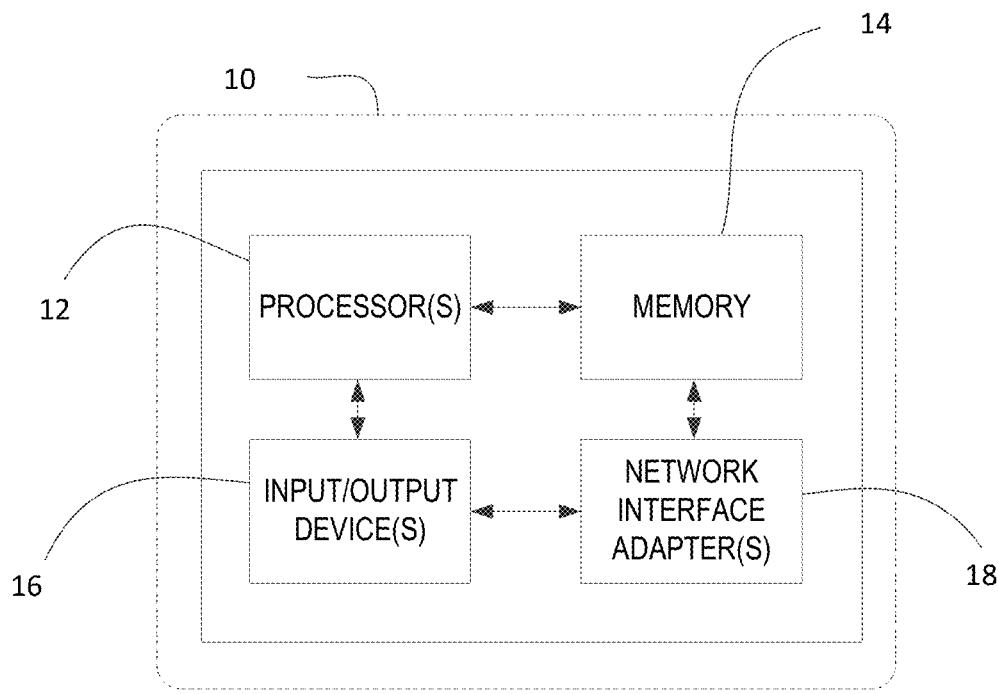
FIG. 1 depicts an example host computer system.

Systems and methods are disclosed for isolation of a host machine's communication with one or more untrusted network destinations. Isolating the host machine's communication with one or more untrusted network destinations may protect the host machine from one or more of command and control infection, data exfiltration, or general automated infection that can occur from communicating with the untrusted network destinations. A host computer system may securely browse, access, and/or communicate with untrusted network destinations, including but not limited to resources accessible via the Internet. The host computer system may be a laptop computer, a mobile phone, a tablet, etc. The host computer system may be connected to a network (e.g., a local area network (LAN), a wide area network (WAN), a cellular network, a Wi-Fi network, a digital subscribers line (DSL) network, a cloud computing network, a data center, an ad-hoc network, a satellite network, a cable modem network, etc.). The host computer system may be a physical machine, a virtual machine, or a combination thereof. The isolation may be enforced via the host computer system itself and/or via one or more network entities located within the network.

Communication isolation may isolate communications associated with one or more web-based applications from other network environment communications. For example, the web-based applications may communicate via a first communication channel and the other network environment communications may use one or more other communication channels. The first communication channel may be isolated from the one or more other communication channels. The first communication channel may be established with a proxy device (e.g., such as a web proxy). The web-based applications may include web browsers, file transfer applications, email applications, chat or instant messaging applications, peer-to-peer (P2P) file sharing applications, automatic web backup applications (e.g., to cloud services), anti-virus and other security applications, collaboration software applications, remote desktop applications, screen and resource sharing applications, gaming applications, applications that rely on cloud resources for processing resources, and/or the like. Examples of web browsers may include Internet Explorer, Safari, Mozilla, Chrome, etc. The file transfer applications may include FileZilla, WinSCP, CyberDuck, FireFTP, etc. The collaboration software applications may include WebEx, LiveMeeting, HP Virtual Room, etc. As may be appreciated, many of these types of applications rely on robust communication networks that allow the application to connect to and communicate with remote locations. However, such reliance can create avenues of attack for malware and other exploits that can utilize the capacities and resources offered to these applications as a means to attack and or control the host computing system.

Systems and methods are described to provide a layer of isolation between these diverse types of applications and untrusted network destinations in order to prevent malware from effectively exfiltrating data from the host computer system and/or establishing command and control channels with an attacker resources in order to attempt to gain control of the host computing system. For example, the communication isolation may protect a network from a computer system operating within the network, that runs a collaboration software. The computer system may isolate the collaboration software from other applications and/or processes operating on the computer system.

Communication isolation may be provided via untrusted memory space segregation. The host computer system may have a sandbox protected application or process and/or an internal isolation firewall running thereon. For example, one or more of the web browsers, file transfer applications, email applications, chat or instant messaging application, P2P file sharing applications, automatic web backup application, anti-virus and other security applications, collaboration software applications, remote desktop applications, screen and resource sharing applications, gaming applications, applications that rely on cloud resources for processing resources, and/or the like may wholly or partially be contained in a sandboxed computing environment. In an example, other isolation methods such as operating the applications within a virtual machine may be used.

The sandbox protected application or process may operate within a sandboxed computing environment. The sandboxed computing environment may include resources (e.g., a limited set of resources) allocated for operation of a sandbox container process. The host computer system may implement the sandboxed computing environment. The sandboxed computing environment may be enforced via the sandbox container process. The sandbox container process may be a security mechanism used to separate the sandboxed computing environment from other applications and/or processes that may be running on a workspace of the host computer system. The sandbox computing environment may be configured to enable operation of one or more applications and/or processes. The sandboxed container process may be configured to enable the one or more applications and/or processes (e.g., such as a browser process) being executed within the sandboxed computing environment to access the resources allocated for operation of the sandbox container process. For example, the one or more applications and/or processes being operated within the sandboxed computing environment may be allowed to access memory associated with the sandboxed computing environment. The memory associated with the sandboxed computing environment may be separate from memory that is configured to enable storage and operation of the workspace. The host computer system may communicate with (e.g., access), using the application and/or process operating on the sandboxed computing environment, untrusted network destinations via a proxy device. The proxy device may be a web proxy, as described herein.

The host computer system may be configured to implement an operating system that enables operation of the workspace. The workspace may include one or more applications and/or processes operating within the operating system that are not restricted by the sandbox container process. The operating system of the host computer system may include a set of resources configured to enable operation of the workspace and the sandbox container process.

The sandbox container process may have access to one or more operating system and/or kernel processes in order to enforce isolation between the workspace associated with the first memory space and the sandboxed computing environment associated with the second memory space. The sandbox container process may enforce the segregation using techniques such as namespace isolation such that processes running in the sandboxed computing environment in the second memory space are restricted from accessing the first memory space including the workspace (e.g., and vice versa). The sandbox container process may restrict access to certain resources by processes running in the sandboxed computing environment. The sandboxed container process may allow the workspace and the sandboxed computing environment to share access to the host operating system and host operating resources (e.g., including the kernel and libraries) while enforcing the segregation of the memory spaces access by the workspace and the sandboxed computing environment. In this manner, the sandbox container process may permit isolation of the sandboxed computing environment without requiring the sandboxed computing environment to boot a separate operating system, load separate libraries, etc., which would require separate private memory for those files.

The one or more processes or applications operating within the sandboxed computing environment may be permitted to communicate with untrusted network destinations via an access connection device. The access connection device may be a proxy device, for example. The one or more processes or applications operating within the sandboxed computing environment may connect to the untrusted network destinations as a dedicated network interface device with using a specific Internet Protocol (IP) address. The one or more processes or applications operating within the sandboxed computing environment may be referred to as sandboxed processes or applications. The host computer system may maintain a list of untrusted network destinations and/or a list of trusted network destinations. The list of trusted network destinations may be a whitelist. The list of untrusted network destinations may be a blacklist. The whitelist and the blacklist may be refined based on username and/or machine identification (ID). For example, the lists of trusted and untrusted network destinations may be different for different users and/or machines associated with a respective network. The whitelist and/or the blacklist may be associated with one or more access levels. For example, a first whitelist and a first blacklist may be assigned to a first access level. An untrusted network destination may be an untrusted resource, an untrusted device, an untrusted website, and/or the like. Since the untrusted network destinations may be sources of malware, the one or more processes or applications operating within the sandboxed computing environment may be allowed to communicate with the untrusted network destination(s), but other communication from the host computer system (e.g., communications originating from outside the sandboxed computing environment such as from within the workspace) to the untrusted network destination(s) may be prevented.

Communication isolation may be provided via a host-based firewall. The host computer system may prevent, using the host-based firewall, communication between the host computer system and one or more other devices on the network. The host-based firewall may be configured to prevent unauthorized communication between applications and/or processes operating in the workspace of the host computer system to other devices on the network over which the host computer is communicating. The host-based firewall may be configured to block incoming communications to the workspace of the host computer system, except for predetermined trusted devices and/or predetermined network ports. The host-based firewall may allow outgoing communications to be sent from a process in the workspace to a non-web-based (e.g., LAN destination). The host-based firewall may be configured to block outgoing communications sent from a process in the workspace to web-based (e.g., non-LAN) destinations.

Communication isolation may be provided via an internal isolation firewall. The sandbox container process may enable the internal isolation firewall. The internal isolation firewall may enable separation between the sandboxed computing environment and the workspace. The internal isolation firewall may be configured to prevent data from being communicated between the sandboxed computing environment and the operating system, for example, without an explicit user input. The applications and/or processes operating within the sandboxed computing environment may be prevented from accessing any additional resources of the host computer system or may be prevented from accessing any additional resources of the host computer system without explicit user action. For example, the internal isolation firewall may generate a command prompt that enables a user selection if an application and/or process operating within the sandboxed computing environment is requesting access to resources outside of the sandbox memory space. By prompting the user to confirm that the applications and/or processes operating within the sandboxed computing environment are permitted to access additional resources outside the sandbox memory space, malware that is designed to attempt to remain transparent to the user may be limited to operation within the sandboxed computing environment. Thus, the malware within the sandboxed computing environment may be unable to access other resources available to the host system generally, such as local area networks and secure memory regions.

The internal isolation firewall may allow certain actions to be performed with approval of the user of the host system. For example, an application and/or process operating within the sandboxed computing environment may be allowed access to the host system to perform one or more of a cut or copy of data, a paste of data, a printing of data to a local printer, a file transfer, and/or the like. The host computer system may prevent one or more other transfers of data between the sandboxed computing environment and the workspace except those user initiated actions described herein. For example, the sandbox container process may prevent unauthorized data transfers between the sandboxed computing environment and the workspace.

FIG. 1 illustrates an example of a host computer system that may implement one or more applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the sandboxed browser and/or other sandboxed applications(s) and/or process(es). The software may restrict sandbox-based access to one more file descriptors, memory, file system space, etc. For example, the applications and/or processes operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a sandbox container process. The sandbox container process may segregate the workspace associated with the first memory space from the sandboxed computing environment associated with the second memory space. For example, the sandbox container process may include an internal isolation firewall. The internal isolation firewall may enforce the segregation of the first and second memory spaces.

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 can allow user interaction with the Host Computer System 10, for example to allow certain interactions between an application or a process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The sandbox container process may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

As described herein, a sandbox protected application or process may be used for communicating with untrusted sources, such as Internet based resources. In this manner, if malware is transferred back to the host computer system due to interactions with the untrusted source, the malware may be isolated to the sandboxed computing environment, which may make it difficult for the malware to infect the workspace of the host computer system. For example, the sandbox container process may prevent the malware toolset from performing a reconnaissance of the host computer system to assess what data is available from the host computer system, such as computing resources, files, network information, additional network connectivity, etc. The sandbox container process (e.g., the internal isolation firewall) may prevent the data on the host computer system from being reported back to the remote device that sent the malware to the host computer and/or any other remote devices.

The sandbox container process may prevent the malware toolset from determining user system privileges of the host computer system, which can be used to access data on any associated network or local area network. For example, applications and/or processes operating within the sandboxed computing environment may not have access and/or authorization to such host computer configurations.

The sandbox container process may prevent the malware toolset from accessing local files stored on the host computer system. For example, the sandbox container process may isolate the first memory space from the second memory space. Such isolation can help prevent the malware from attempting to transmit such information back to the remote device that is the source of the malware. For example, the malware toolset may attempt to transmit a local security database from which additional user credentials can be derived, including potential privileged user credentials. These user credentials may be used by the malware to attempt to gain access to other resources on any associated network or the local area network. Where the user credentials are for a privileged user account, these credentials may be used to gain privileged access to other resources on any associated network or local area network.

The sandbox container process may prevent the malware toolset from accessing a security token and/or hash of the host computer user from the memory of the host computer system and/or a network data stream. This security token or hash can be used to gain access to other resources on any associated network or the local area network. Where the security token or hash is for a privileged user account, this security token or hash may be used to gain privileged access to other resources on any associated network or local area network.

The sandbox container process may prevent the malware toolset from enabling remote control and/or communication with (e.g., access) of the host computer system by a remote device that is unknown to the user. When malware enables remote control and/or access, the remote device may be able to control one or more (e.g., all) operations of an infected host computer system and perform whatever alternative uses that an enslaved, infected host computer system can perform. For example, a remote device may download additional data to an infected host computer system, communicate with other websites for denial of service attacks, and/or convert the infected host computer system into a source of malicious software from which toolsets or secondary payloads are downloaded to other, subsequently infected, host computer systems.

Figure 2:
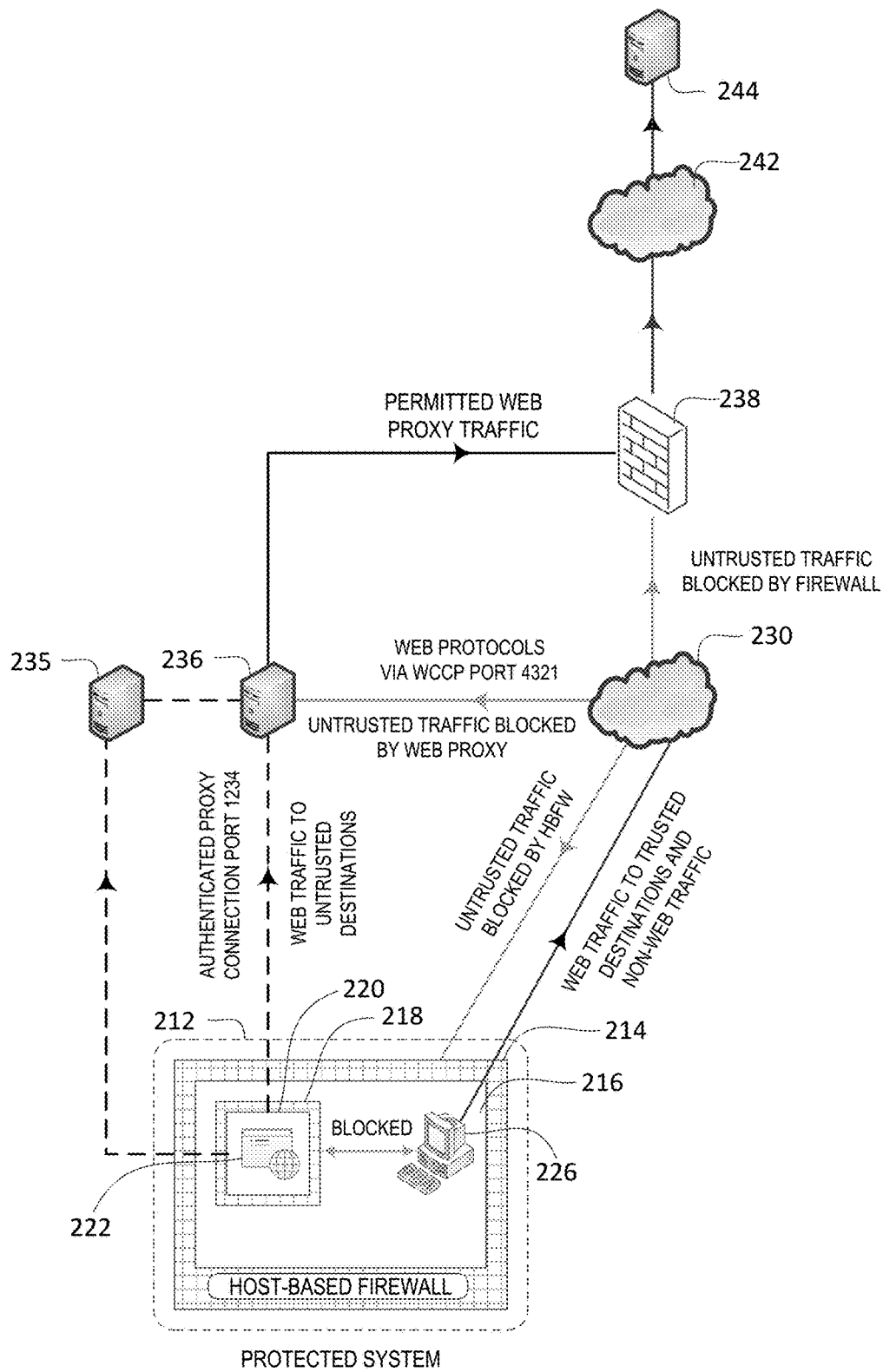
FIG. 2 depicts an example host computer system using a sandbox based network isolation system.

FIG. 2 depicts an example host computer system 212 using a sandbox based internet isolation system. The sandbox based internet isolation system may include a network 230, an authorization device 235, a proxy device 236, and/or a border firewall 238. The network 230 may include one or more host computer systems (e.g., such as the host computer system 212). The host computer system 212 may include a host-based firewall 214, an operating system 226, a sandboxed computing environment 220, an internal isolation firewall 218, and a workspace 216. The host computer system 212 may be any host computer system, such as a cell phone, a pager, a personal computer (PC), a laptop, a vehicle computer system, a kiosk computer system, a server, a workstation, a tablet, a smartphone, a router, a controller, a microcontroller, and/or any other processing and/or communication device. The host computer system 212 may be operatively connected with one or more user-accessible data entry devices, a display device viewable by a user, and/or a computer-accessible data storage. One or more application programs may run on the operating system 226.

As an example, the trusted host computer system 212 may be a PC, with 4 GB RAM and 146 GB hard disk computer-accessible storage, a monitor, a keyboard, and a mouse. The operating system 226 may be Windows-based, Linux-Based, Macintosh-based, and/or the like. The computer-accessible storage may store data corresponding to one or more software programs (e.g., computer-readable instructions) stored on the trusted host computer system 212 for common operation. The software programs may include word processing programs, accounting programs, remote connectivity programs, and/or other types of applications.

The host computer system 212 may be configured to isolate communication with untrusted network destinations. The host computer system 212 may isolate communication with untrusted network destinations using one or more of the host-based firewall 214, the border firewall 238, the proxy device 236, the authorization device 235, an internal isolation firewall 218, or a segregation of untrusted memory space.

The host-based firewall 214 may enable isolation of the host computer system's communication with one or more untrusted network destinations by preventing lateral communication with other devices connected to the network 230. For example, the host computer system 212 may receive untrusted traffic from the network 230. The host-based firewall 214 may be configured to block the untrusted traffic from the network 230. The host-based firewall 214 may be configured to block all incoming traffic from the network 230. The host-based firewall 214 may be configured to allow traffic received by the host computer system 212 via one or more predetermined devices and/or ports. One or more devices (e.g., predetermined devices) connected to the network 230 may bypass the host-based firewall 214, for example, using a predetermined set of protocols and/or ports.

The host-based firewall 214 may be implemented using software and/or hardware. For example, the host-based firewall 214 may be implemented using software that is commercially available, for example, such as Symantec Endpoint Protection, MacAfee Host Based Security Systems, etc. The host-based firewall 214 may be implemented using software inherent in the operating system 226 of the host computer system 212, for example the Windows operating system firewall. The host-based firewall 214 may be implemented using software for configuring and/or implementing restrictive ingress and/or egress policies on the host computer system 212.

The proxy device 236 may enable isolation of the host computer system 212 from one or more untrusted network destinations. The proxy device 236 may be a web proxy. The proxy device 236 may proxy communication between untrusted network destinations and the sandboxed computing environment 220 (e.g., when the sandboxed computing environment 220 has authenticated with the authorization device 235 and/or the proxy device 236). The network 230 may be configured to utilize a Web Cache Control Protocol. The network 230 may redirect web related traffic that is intended for an untrusted resource or network destination (e.g., such as the Internet 242) to the proxy device 236, for example, using the Web Cache Control Protocol. For example, the network 230 may receive traffic via web related traffic from the host computer system 212. The network 230 (e.g., a router in the network 230) may redirect the web related traffic to the proxy device 236, for example. The Web Cache Control Protocol may route the web-related traffic to the proxy device 236 via a predetermined network port, for example, network port 4321 as shown. The proxy device 236 may determine (e.g., uniquely distinguish) that the traffic received from the network 230 is via the Web Cache Control Protocol, for example, based on the network port. The proxy device 236 may be configured to block traffic associated with an untrusted network destination. The proxy device 236 may receive requests from one or more applications and/or processes operating within the workspace 216 of the host computer system 212. The proxy device 236 may be configured to block one or more requests sent from the one or more applications and/or processes operating within the workspace 216 of the trusted host computer system 212, for example, based on the one or more requests being associated with the network port on which it is received, for example 4321.

The proxy device 236 may be configured to allow one or more processes and/or applications (e.g., browser process 222) operating within the sandboxed computing environment 220 of the trusted host computer system 212 to communicate with an untrusted network destination. A sandbox container process may enable the sandboxed computing environment 220. The sandboxed computing environment 220 may authenticate with an authorization device 235. The sandboxed computing environment 220 may send authentication credential(s) to the authorization device 235. The authorization device 235 may provide authentication information associated with the sandboxed computing environment 220 to the proxy device 236. Alternatively, the sandboxed computing environment 220 may authenticate with the proxy device 236. For example, the sandbox container process may authenticate with the authorization device 235 and/or the proxy device 236 on behalf of the one or more processes and/or applications operating within the sandboxed computing environment. The sandbox container process may be configured to authenticate with the authorization device and/or the proxy device 236 using preconfigured credentials stored within an encrypted configuration file. When the sandbox container process has successfully authenticated with the authorization device 235 and/or the proxy device 236, the proxy device 236 may allow the one or more processes and/or applications operating within the sandboxed computing environment 220 to communicate with the untrusted network destination. The authorization device 235 and the proxy device 236 may be the same device (e.g., a single combined device).

The border firewall 238 may enable isolation of the host computer system 212 (e.g., the workspace 216) from one or more untrusted network destinations. The border firewall 238 may be configured to restrict traffic to the untrusted network destinations (e.g., the Internet 242) from the proxy device 236 and/or the network 230 (e.g., enterprise router 234. The host computer systems 212 may communicate with a whitelisted web server and/or an untrusted web server, for example, via the border firewall 238. The border firewall 238 may be configured to block communication between the host computer system 212 and one or more untrusted network destinations, for example the Internet 242. For example, the border firewall 238 may be configured to block untrusted traffic that is not routed through the proxy device 236.

The sandboxed computing environment 220 may include resources (e.g., a limited set of resources) allocated to operation of a sandbox container process. The sandboxed computing environment 220 may be enforced via the sandbox container process. The sandbox container process may be a security mechanism used to separate resources associated with the sandboxed computing environment 220 from other applications and/or processes that may be running on a workspace 216 of the host computer system 212. The sandboxed container process may be configured to enable one or more applications and/or processes (e.g., such as browser process 222) being executed within the sandboxed computing environment 220 to access the resources allocated for operation of the sandbox container process. For example, the one or more applications and/or processes being operated within the sandboxed computing environment 220 may be allowed to access memory associated with the sandboxed computing environment 220. The memory associated with the sandboxed computing environment 220 may be separate from memory that is configured to enable storage and operation of the workspace 216.

The workspace 216 may include one or more processes operating within the operating system 226 that are not restricted by the sandbox container process. The operating system 226 of the host computer system 212 may include a set of resources configured to enable operation of the workspace 216 and the sandbox container process.

The host computer system 212 may enable the host-based firewall 214. The host-based firewall 214 may prohibit and/or prevent communication (e.g., direct communication) between the host computer system 212 and other devices on the network 230. Each device on the network 230 may include a host-based firewall (e.g., such as the host-based firewall 214). The host-based firewall 214 may prohibit and/or prevent communication (e.g., direct communication) between the host computer system 212 and other devices within the network 230. For example, the host-based firewall 214 may be configured to block incoming traffic from the other devices within the network 230. The host-based firewall 214 may allow traffic received by the host computer system 212 via one or more predetermined devices and/or ports. For example, one or more devices (e.g., predetermined devices) on the network 230 may bypass the host-based firewall 214, for example, using a predetermined set of protocols and/or ports.

The host-based firewall 214 may be implemented using software and/or hardware. For example, the host-based firewall 214 may be implemented using software that is commercially available, for example, such as Symantec Endpoint Protection, MacAfee Host Based Security Systems, etc. The host-based firewall 214 may be implemented using software inherent in the operating system 226 of the trusted host computer system 212, for example the Windows operating system firewall. The host-based firewall 214 may be implemented using software for configuring and/or implementing restrictive ingress and/or egress policies on the host computer system 212.

The host computer system 212 may run the sandboxed computing environment 220. The sandboxed computing environment 220 may run within the operating system 226 of the host computer system 212. For example, the sandboxed computing environment 220 may be configured to run within a second memory space of the host computer system 212. A first memory space may be configured to enable storage and operation of a workspace configured to execute a first set of one or more applications and/or processes running on the operating system 226 of the host computer system 212. For example, a browser process 222 may operate within the sandboxed computing environment 220. The sandboxed computing environment 220 may be prohibited from communicating with other devices within the network 230. The browser process 222 may be configured to enable communication with untrusted network destinations.

Browser solutions running within the workspace 216 of the host computer system 212 may be utilized for communication between the host computer system 212 and trusted network destinations. For example, the one or more applications or processes running within the workspace 216 of the host computer system 212 may enable communication with the trusted network destinations.

The sandboxed computing environment 220 and/or the sandbox container process may be implemented using software and/or hardware. For example, the sandboxed computing environment 220 and/or the sandbox container process may be implemented using software that is commercially available, for example, such as Invincea Endpoint Protection, Tanium Endpoint Platform, Bromium Advanced Endpoint Security, etc.

The sandboxed computing environment 220 may provide separate and/or isolated memory space from the workspace 216 of the host computer system 212. For example, the sandboxed computing environment 220 may be enforced using a sandbox container process. The sandbox container process may segregate the workspace 216 from the sandboxed computing environment 220. The first memory space (e.g., the workspace memory) may enable storage and/or operation of the workspace 216. The operating system 226 may enable operation of the sandboxed computing environment 220. The second memory space may enable storage and/or operation of one or more applications and/or processes associated with the sandboxed computing environment 220. For example, the second memory space may be reserved for storage and/or operation of the applications and/or processes running within the sandboxed computing environment 220. The sandbox container process may isolate the first memory space and the second memory space. For example, the sandbox container process may enable the internal isolation firewall 218. The internal isolation firewall 218 may enforce a separation of the first and second memory spaces. For example, the internal isolation firewall 218 may allow a predefined set of processes to be executed within the sandboxed computing environment 220. The internal isolation firewall 218 may prevent execution, in the sandboxed computing environment 220, of any processes outside of the predefined set of processes. The second memory space may be referred to as a separate and/or isolated memory space. The sandbox container process may segregate the second memory space, any additional processes and/or memory usage required for usage of untrusted network destination related content during an established communication session. Separation and/or isolation of computer resources may be referred to as a virtual air gapped solution. The first memory space and the second memory space may be separate physical memory locations. The first memory space and the second memory space may be collocated on a physical memory. The first memory space and the second memory space may be enforced via a software partition.

If malware in a sandboxed computing environment 220 is able to communicate with (e.g., access) the resources, assets, and/or files of the operating system 226, the host computer system 212 may be considered infected and untrusted. For example, the malware may bypass the internal isolation firewall 218 via explicit user input. The host-based firewall 214 may prohibit the introduced malware from communicating with any other device on the network 230. For example, the host-based firewall 214 may be configured to block incoming traffic from the network 230.

Malware may be introduced to the operating system 226 from a source other than communication with the Internet 242. For example, malware may be introduced to the operating system 226 via an infected email, an infected USB memory stick, and/or another infected hardware device.

An infected and/or untrusted host computer system (e.g., regardless of the introduced malware's vector) may have no communication (e.g., direct communication) with the Internet 242. For example, the border firewall 238 may prevent the infected and/or untrusted host computer system from communicating with the Internet 242. Without a connection to (e.g., communication with) the Internet 242, the introduced malware may be prevented from performing many toolset functions described herein or any other function that an enslaved, infected and/or untrusted host computer system may perform. Without a connection to the Internet 242, the introduced malware may not be able to transfer any data from the infected and/or untrusted host computer system to the Internet 242.

The host computer system 212 and/or the network 230 may limit the adverse effects associated with a received malware. For example, the host computer system 212 and/or the network 230 may prevent the received malware from using its vector to communicate data from the host computer system 212.

An author of the malware may not be aware of any level of efficacy of the introduced malware and/or its successful attack vector. The host computer system 212 and/or the network 230 may prevent data of an infected and/or untrusted host computer system that may have been compromised and/or collected by the malware from being communicated to the author of the malware. For example, the host computer system 212 may prevent communication between an infected and/or untrusted host computer system and the Internet 242 (e.g., the author of the malware via the Internet 242).

Figure 3:
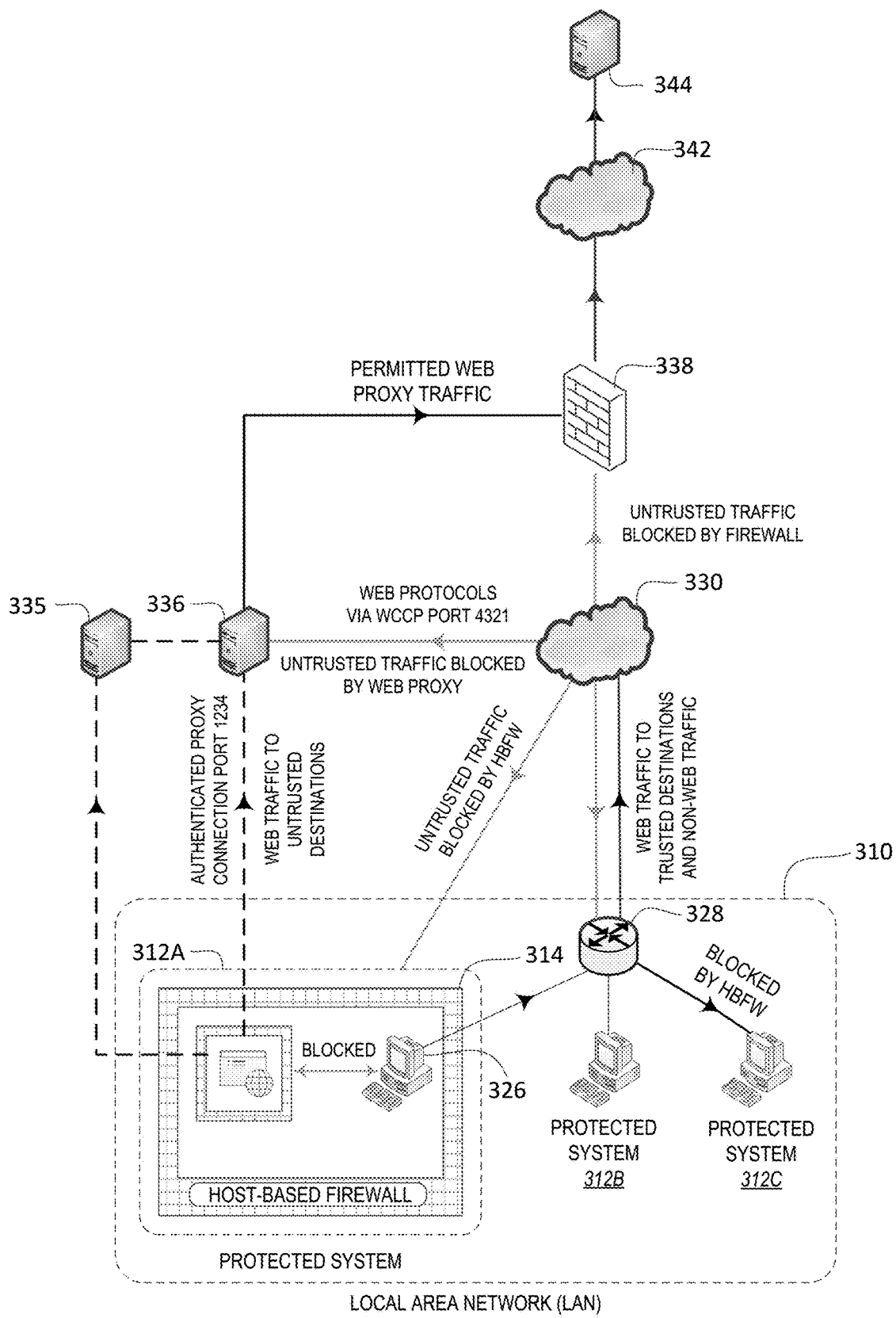
FIG. 3 depicts an example host computer system connected to a local area network (LAN), the example host computer system using a sandbox based network isolation system.

FIG. 3 depicts an example host computer system 312A (e.g., such as the host computer system 212 shown in FIG. 2) connected to a local area network (LAN) 310, the example host computer system 312A using a sandbox based network isolation system. The LAN 310 may include a plurality of physical and/or virtual devices. The LAN 310 may include a plurality of host computer systems 312A, 312B, 312C. Each of the host computer systems may transmit electrical data signals to one or more other host computer systems on the LAN 310. Each of the host computer systems may be identified by a unique local area network address. The LAN 310 may include a router 328. The host computer systems 312A, 312B, 312C may send web traffic and/or non-web traffic to a trusted network 330 via the router 328. The LAN 310 may send web traffic to one or more untrusted network destinations using one or more of the trusted network 330, a border firewall 338, or a proxy device 336. For example, the LAN 310 may communicate with the internet 342 and/or a device 344 on the internet 342 via the trusted network 330, the border firewall 338, and/or the proxy device 336.

The web traffic sent to the trusted network 330 may be destined for trusted destinations. The LAN 310 may enable a connection to a cloud-based computing system. The connection to the cloud-based computing system may be a direct connection. The LAN 310 may be part of a cloud interexchange. The LAN 310 may be part of a cloud "meet me" point of presence.

Each of the host computer systems 312A, 312B, 312C may enable a host-based firewall 314. The host-based firewall 314 may prohibit and/or prevent communication (e.g., direct communication) between the respective host computer system 312A, 312B, 312C and other devices on the LAN 310. The host-based firewall 314 may prohibit and/or prevent communication (e.g., direct communication) between the host computer system 312A and other devices within the trusted network 330. For example, the host-based firewall 314 may be configured to block incoming traffic from the other devices within the LAN 310 and/or the trusted network 330. The host-based firewall 314 may allow traffic to be received by the host computer system 312A via one or more predetermined devices and/or ports. For example, one or more devices (e.g., predetermined devices) on the LAN 310 and/or the trusted network 330 may bypass the host-based firewall 314, for example, using a predetermined set of protocols and/or ports.

The host-based firewall 314 may be implemented using software and/or hardware. For example, the host-based firewall 314 may be implemented using software that is commercially available, for example, such as Symantec Endpoint Protection, MacAfee Host Based Security Systems, etc. The host-based firewall 314 may be implemented using software inherent in the operating system 326 of the host computer system 312A, for example the Windows operating system firewall. The host-based firewall 314 may be implemented using software for configuring and/or implementing restrictive ingress and/or egress policies on the host computer system 312A.

Figure 4:
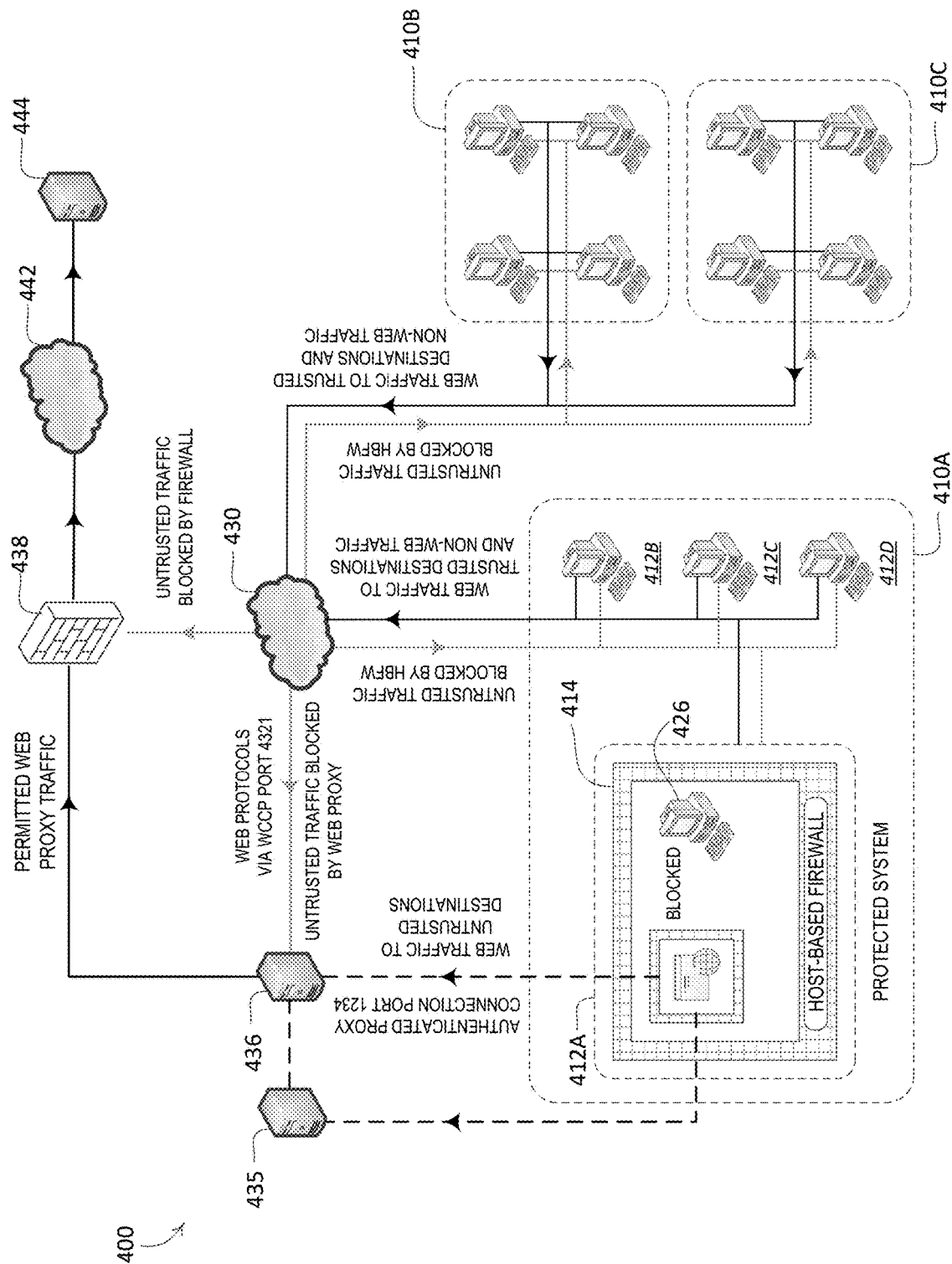
FIG. 4 depicts an example host computer system connected to a wide area network (WAN), the example host computer system using a sandbox based network isolation system.

FIG. 4 depicts an example host computer system 412A (e.g., such as host computer system 212, 312A shown in FIGS. 2 and 3, respectively) connected to a wide area network (WAN) 400, the example host computer system 412A may include a sandbox based network isolation system. The WAN 400 may include a plurality of LANs 410A, 410B, 410C; a trusted network 430, a proxy device 436 (e.g., such as the proxy device 236, 336 shown in FIGS. 2 and 3, respectively), and a border firewall 438 (e.g., such as the border firewall 238, 338 shown in FIGS. 2 and 3, respectively). The WAN 400 may include virtual and/or physical devices. The WAN 400 may be configured to enable communicate with the internet 442 and/or a device 444 on the internet 442 via the border firewall 438. The WAN 400 may enable a connection to a cloud-based computing system. The connection to the cloud-based computing system may be a direct connection. The WAN 400 may be part of a cloud interexchange. The WAN 400 may be part of a cloud "meet me" point of presence.

Each of the LANs 410A, 410B, 410C may include a plurality of host computer systems. For example, LAN 410A may include host computer systems 412A, 412B, 412C, 412D. Each host computer system of a respective LAN may be configured to send electrical data signals to one or more other host computer systems on the respective LAN. For example, the host computer systems 412A, 412B, 412C, 412D of the LAN 410A may send data to each other. Each of the host computer systems may be identified by a unique local area network address. The LANs 410A, 410B, 410C (e.g., each host computer system in the LANs 410A, 410B, 410C) may send web traffic and/or non-web traffic to a trusted network 430. The web traffic sent to the trusted network 430 may be destined for trusted destinations.

Each of the host computer systems (e.g., host computer systems 412A, 412B, 412C, 412D of LAN 410A) may enable a host-based firewall. For example, host computer system 412A may enable the host-based firewall 414. The host-based firewall 414 may prohibit and/or prevent communication (e.g., direct communication) between the respective host computer systems 412A, 412B, 412C, 412D and other devices on the LAN 410A. The host-based firewall 414 may prohibit and/or prevent communication (e.g., direct communication) between the host computer system 412A and other devices within the WAN 400. For example, the host-based firewall 414 may be configured to block incoming traffic from the other devices within the LAN 410A and/or the WAN 400. The host-based firewall 414 may allow traffic to be received by the host computer system 412A via one or more predetermined devices and/or ports. For example, one or more devices (e.g., predetermined devices) on the LAN 410A and/or the WAN 400 may bypass the host-based firewall 414, for example, using a predetermined set of protocols and/or ports.

The host-based firewall 414 may be implemented using software and/or hardware. For example, the host-based firewall 414 may be implemented using software that is commercially available, for example, such as Symantec Endpoint Protection, MacAfee Host Based Security Systems, etc. The host-based firewall 414 may be implemented using software inherent in the operating system 426 of the host computer system 412A, for example the Windows operating system firewall. The host-based firewall 414 may be implemented using software for configuring and/or implementing restrictive ingress and/or egress policies on the host computer system 412A.

The border firewall 438 may prevent unauthorized communication between the WAN 400 and the internet 442. The border firewall 438 may prevent unauthorized communication between one or more devices in the WAN 400 and the internet 442. The WAN 400 may include multiple border firewalls. For example, each LAN of the WAN 400 may include a border firewall.

Mobile phones, tablets, and/or other connected devices may enter and leave the WAN 400. For example, due to the large geographic area covered by the WAN 400, devices may join and leave the WAN 400 more frequently than a LAN. A device may move from a first WAN (e.g., the WAN 400) to a second WAN. The host-based firewall may protect the device in both the first WAN and the second WAN. An infected device may join the WAN 400. The host-based firewall of the other devices in the WAN 400 may be configured to isolate communication from the infected device.

Figure 5:
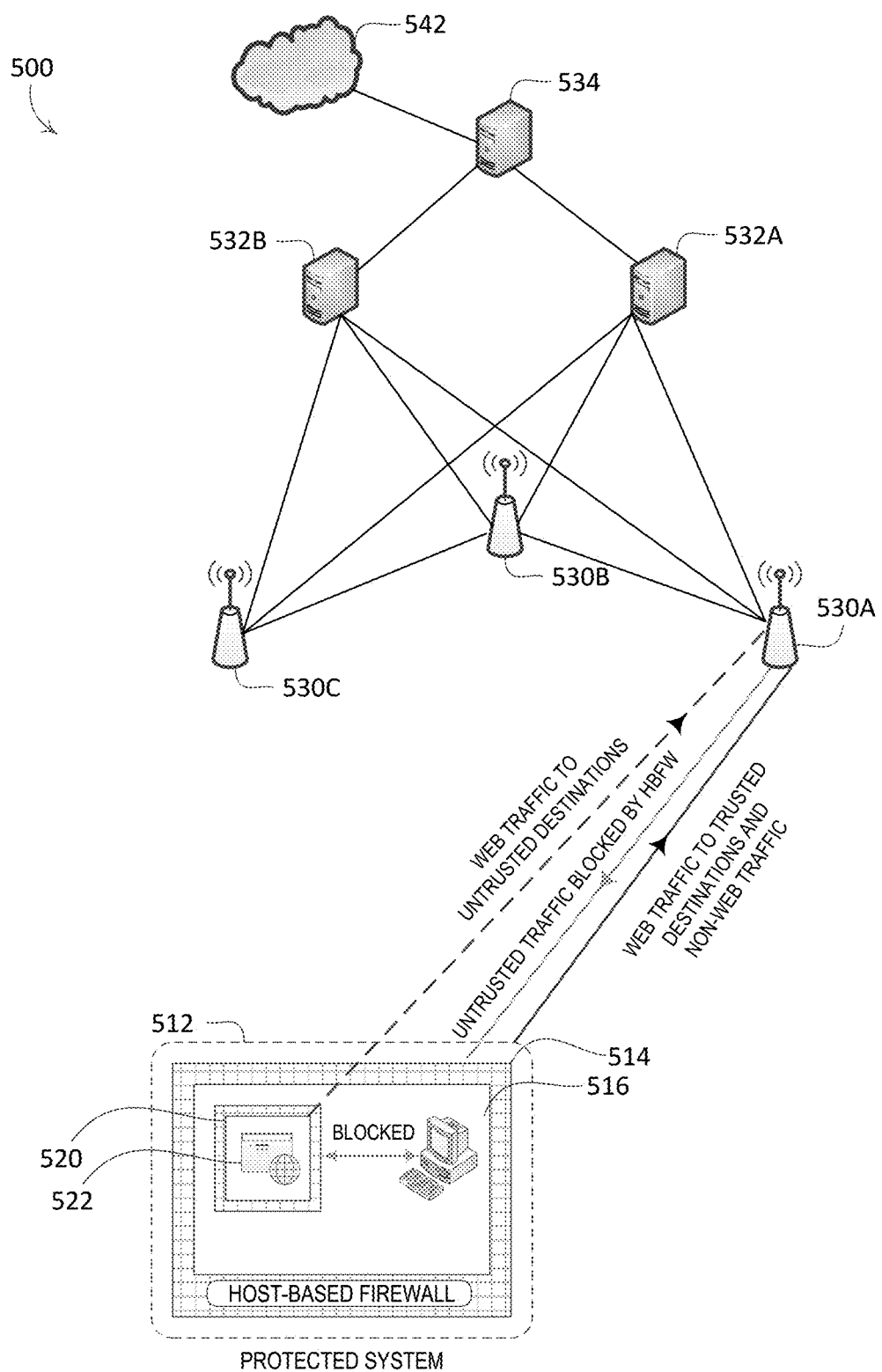
FIG. 5 depicts an example host computer system connected to a cellular radio access network (RAN), the example host computer system using a sandbox based network isolation system.

FIG. 5 depicts an example host computer system 512 (e.g., such as host computer system 212, 312A, 412A shown in FIGS. 2, 3, and 4, respectively) connected to a cellular radio access network (RAN) 500, the example host computer system 512 may include a sandbox based network isolation system. The RAN 500 may include a plurality of eNodeBs 530A, 530B, 530C; one or more serving gateways (GWs) 532A, 532B, and a packet GW 534. Virtual and/or physical devices may connect to the RAN 500. A device may connect to the RAN 500 via a virtual private network (VPN) client. The RAN 500 may be configured to enable communication with the internet 542 via the packet GW 534. For example, the host computer system 512 may send web traffic to one or more untrusted network destinations via the eNodeB 530A, the serving GW 532A, and the packet GW 534. The host computer system 512 may send web traffic to one or more trusted destinations via the eNodeB 530A. The host computer system 512 may send non-web traffic to the eNodeB 530A. A proxy device (e.g., such as proxy device 236 shown in FIG. 2, proxy device 336 shown in FIG. 3, and/or proxy device 436 shown in FIG. 4) may be included within a serving GW 532A, 532B and/or the packet GW 534. The proxy device may receive, from the host computer system 512, the web traffic destined for the one or more untrusted network destinations. The proxy device may authenticate the host computer system 512.

The host computer system 512 may enable a host-based firewall 514. The host-based firewall 514 may prohibit and/or prevent communication (e.g., direct communication) between the host computer system 512 and other devices connected to the RAN 500. The host-based firewall 514 may prohibit and/or prevent communication (e.g., direct communication) between the host computer system 512 and other devices on the internet 542. For example, the host-based firewall 514 may be configured to block incoming traffic from the eNodeB 530A. The host-based firewall 514 may allow traffic to be received by the host computer system 512 via one or more predetermined devices and/or ports. For example, the eNodeB 530A may bypass the host-based firewall 514, for example, using a predetermined set of protocols and/or ports.

The host-based firewall 514 may be implemented using software and/or hardware. For example, the host-based firewall 514 may be implemented using software that is commercially available, for example, such as Symantec Endpoint Protection, MacAfee Host Based Security Systems, etc. The host-based firewall 514 may be implemented using software inherent in the operating system 526 of the host computer system 512, for example the Windows operating system firewall. The host-based firewall 514 may be implemented using software for configuring and/or implementing restrictive ingress and/or egress policies on the host computer system 512.

A sandbox based network isolation system may be used in a data center. The data center may be local or cloud-based. For example, one or more servers, databases, switches, and/or hubs of the data center may include a sandbox based network isolation system. The sandbox based network isolation system may prevent data from passing between the devices of the data center, for example, except for predetermined devices and/or ports. If a database of the data center becomes infected with malware, the other devices in the data center may prevent infection because communication from the other devices in the data center may be blocked by their respective host-based firewalls. As another example, a database in a data center may enable multiple segregated storage spaces, as described herein. The storage spaces may be segregated such that data may not be exchanged. An internal isolation firewall may enable segregation of storage spaces. For example, each storage space may be associated with an internal isolation firewall. If a storage space in the database of the data center becomes infected with malware, the database may prevent infection of the other storage spaces in the database because communication between the storage spaces may be blocked, for example, by their respective internal isolation firewalls.

A device with a sandbox based network isolation system may travel between, connect to, and/or communicate with more than one network environment. For example, a device with a sandbox based network isolation system may travel between, connect to, and/or communicate with one or more of a LAN, a WAN, a WWAN, a cellular network, a digital subscriber line (DSL) network, a Wi-Fi network, a LPWA network, a satellite network, an infrastructure as a service (IaaS) network, a platform as a service (PaaS) network, and/or the like. The device may be configured to provide network isolation by using a host-based firewall, an internal isolation firewall, and/or a segregation of memory space. The host-based firewall may enable network isolation of the device across different network environments. For example, the host-based firewall may prevent communications from other devices in the different network environments.

A device having sensitive, private, and/or security data may include a sandbox based network isolation system. A device having access to sensitive, private, and/or security data may include a sandbox based network isolation system. The sandbox based network isolation system may be configured to prevent access by unauthorized devices to the sensitive, private, and/or security data. For example, the sensitive, private, and/or security data may be stored in a first memory space of the host computer system. The host computer system may enable communication with untrusted network destinations via a second memory space. The host computer system may enforce segregation of the first memory space and the second memory space. For example, any malware introduced to the second memory space from communication with the untrusted network destinations may be prevented from accessing the first memory space. The segregation of the first memory space and the second memory space may be software-based and/or hardware-based. For example, the first memory space may be enabled by a first hard drive and the second memory space may be enabled by a second hard drive. As another example, the first memory space and the second memory space may be enabled by a single hard drive. The first memory space and the second memory space may be associated with one or more partitions in the single hard drive. An internal isolation firewall, as described herein, may enforce the segregation of the first memory space and the second memory space.

A sandbox based network isolation system may be used to prevent malware from establishing command and control on a computer system (e.g., a desktop computer, a laptop computer, a tablet, a mobile phone, etc.). For example, the sandbox based network isolation system may be configured to operate on a computer system running Windows, Linux, MacOS, iOS, Android, Windows Mobile, and/or some other operating system.

A sandbox based network isolation system may prevent malware from moving from a first computer system to a second computer system on the same network environment. For example, when a computer system in a network environment is infected with malware, the sandbox based network isolation system may prevent proliferation of the malware within the network environment.

A sandbox based network isolation system may increase the security posture of an enterprise network (e.g., a WAN, a LAN, and/or a VM infrastructure). For example, the sandbox based network isolation system may protect the enterprise network from malware, command and control attacks, viruses, and/or data exfiltration attacks.

The terms used herein should be seen to be terms of description rather than of limitation. It is understood that those of skill in the art with this disclosure may devise alternatives, modifications, or variations of the principles of the invention. It is intended that all such alternatives, modifications, or variations be considered as within the spirit and scope of this invention, as defined by the following claims.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions and/or functional modules described herein.

What is claimed:

1. A host computer system configured to connect to a network, wherein the host computer system comprises:
   a memory; and
   a processor configured to:
   implement a host operating system that enables operation of a workspace, the workspace configured to enable operation of a first set of one or more applications or processes via a first memory space;
   implement a sandboxed computing environment that uses the host operating system and is configured to enable operation of a second set of one or more applications or processes via a second memory space, and is configured to authenticate with an authorization device;
   isolate, using an internal isolation firewall, the sandboxed computing environment that uses the host operating system from the workspace, the internal isolation firewall being configured to prevent data from being communicated between the sandboxed computing environment and the workspace without an explicit user input, and wherein the internal isolation firewall isolates the first memory space from the second memory space;
   prevent, using a host-based firewall, communication between the host computer system and one or more other devices on the network; and
   communicate, using the second set of one or more applications or processes operating on the sandboxed computing environment, with untrusted network destinations via a proxy device.

2. The host computer system of claim 1, wherein the sandboxed computing environment is enforced by a sandbox container process that enables the internal isolation firewall.

3. The host computer system of claim 2, wherein the internal isolation firewall enforces a separation of the sandboxed computing environment and the workspace by:
   segregating storage memory associated with the workspace from storage memory associated with the sandboxed computing environment; and
   allowing a predefined set of processes to be executed within the sandboxed computing environment, wherein the sandbox container process prevents execution in the sandboxed computing environment of a process outside of the predefined set of processes.

4. The host computer system of claim 1, wherein the sandboxed computing environment is configured to classify a network destination as trusted or untrusted based on one or more of a whitelist comprising a list of trusted network destinations or a blacklist comprising a list of untrusted network destinations.

5. The host computer system of claim 4, wherein the trusted network destinations are communicated with via one or more of the first set of one or more applications and processes associated with the workspace.

6. The host computer system of claim 5, wherein at least one of the untrusted network destinations is located on the Internet and is communicated with, using the proxy device, via a browser process operating within the sandboxed computing environment upon authentication via the authorization device.

7. The host computer system of claim 1, wherein the host-based firewall is configured to block incoming traffic from the one or more devices on the network and one or more devices on the Internet.

8. The host computer system of claim 1, wherein the authorization device and the proxy device are the same device.

9. A system comprising:
   an authorization device comprising a first processor, the first processor configured to:
   receive authentication credentials from a sandboxed computing environment operating via a second memory space on a host computer system on a network, the sandboxed computing environment using a host operating system and being isolated from a workspace operating via a first memory space using an internal isolation firewall, the workspace being associated with the host operating system of the host computer system; and
   authenticate the sandboxed computing environment of the host computer system using the received authentication credentials; and
   a proxy device comprising a second processor, the second processor configured to:
   receive, from a first application or process operating in the authenticated sandboxed computing environment of the host computer system, a first request to communicate with a first untrusted network destination;
   allow the first application or process operating in the authenticated sandboxed computing environment to communicate with the first untrusted network destination;
   receive, from a second application or process operating on the workspace of the host computer system, a second request to communicate with a second untrusted network destination; and
   prevent the second application or process operating on the workspace of the host computer system from communicating with the second untrusted network destination.

10. The system of claim 9, wherein the authentication credentials are first authentication credentials, the sandboxed computing environment is a first sandboxed computing environment, the workspace is a first workspace, and the host computer system is a first host computer system, and wherein the first processor of the authorization device is further configured to:
   receive second authentication credentials from a second sandboxed computing environment operating on a second host computer system on the network, the second sandboxed computing environment being isolated from a second workspace of the second host computer system; and
   authenticate the second sandboxed computing environment of the second host computer system using the received second authentication credentials.

11. The system of claim 10, wherein the second processor of the proxy device is further configured to:
- receive, from a third application or process operating in the authenticated second sandboxed computing environment of the second host computer system, a third request to communicate with a third untrusted network destination; and
- allow the third application or process operating in the authenticated second sandboxed computing environment to communicate with the third untrusted network destination.

12. The system of claim 9, wherein a network destination is classified as trusted or untrusted based on one or more of a whitelist comprising a list of trusted network destinations or a blacklist comprising a list of untrusted network destinations, and wherein the second processor of the proxy device is further configured to:
- receive, from the network, a third request to communicate with the network destination;
- determine that the network destination is a trusted network destination on the whitelist; and
- allow, based on a determination that the network destination is a trusted network destination, communication between the network destination and the network.

13. The system of claim 9, wherein the authentication credentials comprise preconfigured credentials stored within an encrypted configuration file.

14. The system of claim 9, wherein the second processor of the proxy device is further configured to establish a communication channel between the host computer system and the first untrusted network destination.

15. The system of claim 9, further comprising a border firewall that is configured to prevent unauthorized communication between the network and untrusted network destinations.

16. An Internet isolation system comprising:
- a host computer system comprising a first processor configured to:
  - prevent, using a host-based firewall, communication and data transfer to another host computing system,
  - implement a host operating system and a sandboxed computing environment, the host operating system configured to enable operation of a workspace that is configured to enable operation of a first set of one or more applications or processes via a first memory space, the sandboxed computing environment that uses the host operating system and is configured to enable operation of a second set of one or more applications or processes via a second memory space, and
  - isolate, using an internal isolation firewall, the sandboxed computing environment that uses the host operating system from the workspace, and wherein the internal isolation firewall isolates the first memory space from the second memory space;
- an authorization device comprising a second processor configured to authenticate the sandboxed computing environment of the host computer system that uses the host operating system upon receipt of an authentication credential from the sandboxed computing environment;
- a proxy device comprising a third processor configured to:
  - proxy communication between an untrusted network destination and the authenticated sandboxed computing environment, and
  - prevent communication between the workspace of the host computer system and the untrusted network destination; and
- a border firewall configured to block an unauthorized communication between a network and the untrusted network destination.

17. The Internet isolation system of claim 16, wherein the first processor of the host computing system is further configured to:
- determine that a malware has infected the sandboxed computing environment; and
- prevent the malware from communicating with the workspace of the host computer system.

18. The Internet isolation system of claim 16, wherein the first processor of the host computing system is further configured to:
- determine that a malware has infected the sandboxed computing environment; and
- prevent the malware from communicating with another host computer system.

19. The Internet isolation system of claim 18, wherein the third processor of the proxy device is further configured to prevent the malware from communicating with the untrusted network destination.

* * * * *